UNITED STATES PATENT OFFICE.

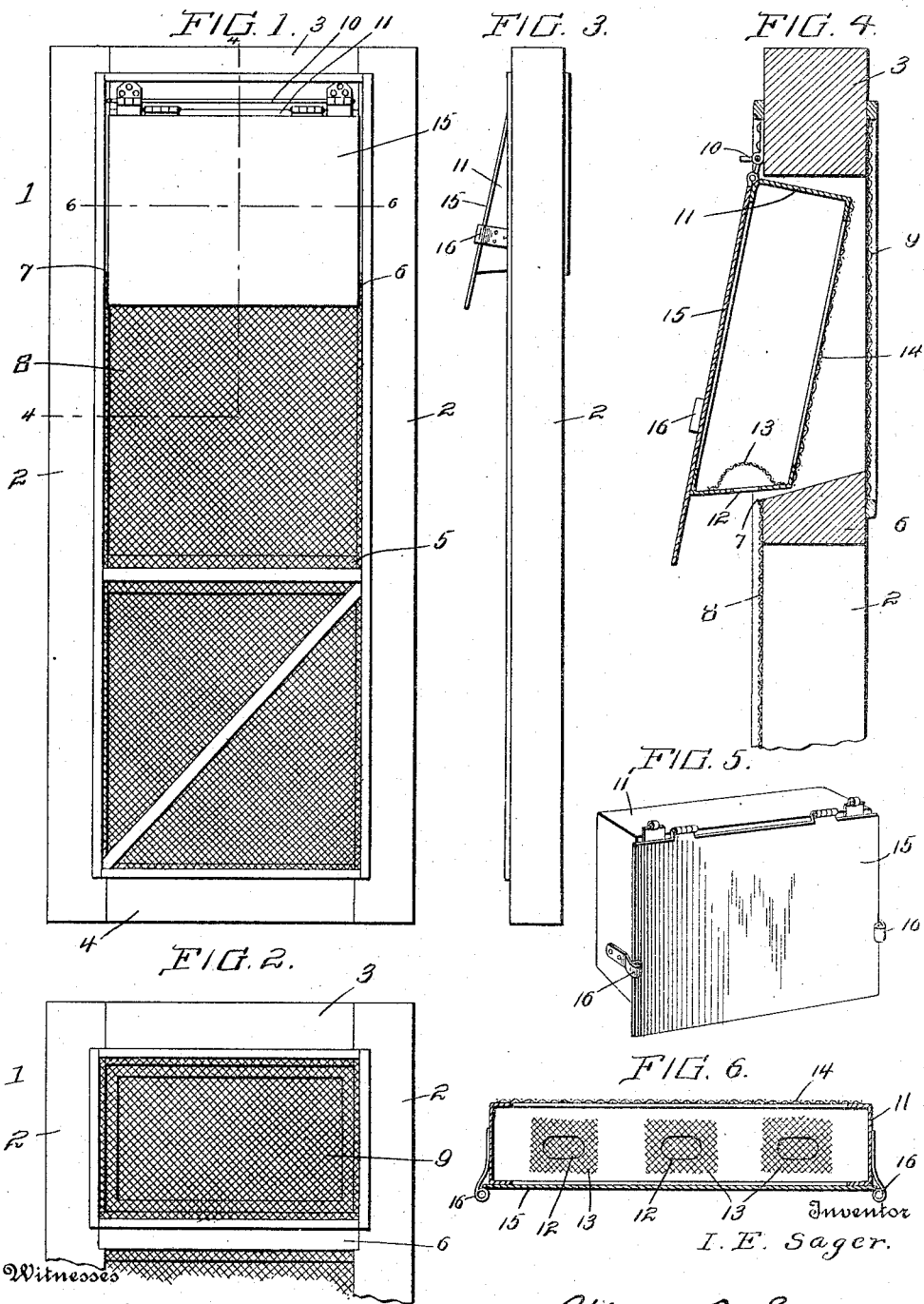

IRA E. SAGER, OF VICTOR, COLORADO.

FLY-TRAP FOR SCREEN-DOORS.

1,192,229. Specification of Letters Patent. Patented July 25, 1916.

Application filed October 23, 1915. Serial No. 57,506.

*To all whom it may concern:*

Be it known that I, IRA E. SAGER, a citizen of the United States, residing at Victor, in the county of Teller and State of Colorado, have invented new and useful Improvements in Fly-Traps for Screen-Doors, of which the following is a specification.

This invention relates to fly traps and more particularly to that type employed with screen doors and the like.

One of the principal objects of the invention is to provide an outside trap which may be readily removed for clearing the flies and which may be held either in operative or inoperative position, as desired.

Further objects of the invention will appear as the following specific description is read in connection with the accompanying drawing which forms a part of this application, and in which:—

Figure 1 is an elevation looking from the outside. Fig. 2 is a detail elevation looking from the inside. Fig. 3 is an edge elevation of the door. Fig. 4 is a vertical sectional view taken on the line 4—4 of Fig. 1. Fig. 5 is a perspective view of the trap removed and Fig. 6 is a horizontal sectional view taken through the trap when removed on approximately the line 6—6 of Fig. 1.

Referring more particularly to the drawing, the particular embodiment of the trap has been shown herein, to be applied to a screen door, the numeral 1 indicating the frame consisting of vertical stiles 2, top and bottom rails 3 and 4 and a center rail 5. Extending across the door beyond the vertical stiles is a cross-piece 6 beveled upon its upper side as shown at 7 and extending from this cross-piece to the lower rail on the outside of the door is a screen fabric 8, while on the inner side of the door a screen fabric 9 extends from the cross-bar 7 to the top rail 3.

Hinged to the top rail by an elongated hinge rod 10, which is made removable, is a rectangular frame 11 preferably of metal with the bottom thereof provided with a plurality of perforations 12 covered by arc-shaped strips of screen fabric 13, said arc-shaped strips forming channels which prevent direct communication into the interior of the frame. The inside of the frame is covered with screen fabric 14 and hinged to the upper rail of the frame 11 is a closing lid or cover 15 of imperforate material, preferably metal. This lid is held in closed position by means of snap catches 16 secured to opposite sides of the frame 11 and arranged to engage over the side edges of the lid 15. The trap consisting of the frame 11, fabric 14 and lid 15, is constructed in such manner that when suspended upon the elongated hinged rod will hang at an angle to the vertical so as to expose the holes 12 in the under side of the frame, when the trap is in operative position.

It is a well-known fact that flies and other similar insects crawl upwardly on the screen, and as the lid 15 extends below the lower edge of the trap frame the flies get beneath this portion of the lid and attracted by the light that is visible through the openings 12 they take their natural upward course, and crawl through the openings and through the channel members 13 into the trap. When the trap is filled, it may be removed from the door and held over a flame or immersed in water and the lid opened and flies removed. When it is desired to close the trap, it may be pushed inwardly into the space between the forward edge of the cross-piece 6 and the screen fabric 9. In this position, the lid 15 is flush with the surface of the door or practically so. By hinging the trap in this manner, it will also be noted that when the door is pushed back against the wall the trap will not be broken, but will swing freely into the space mentioned.

What is claimed is:—

1. The combination with a screen door, of a cross strip on the door arranged in spaced relation with the top rail thereof, a rod removably connected with the top rail of the door, a frame supported in an inclined position by said rod and having an inclined bottom wall provided with spaced openings arranged adjacent said cross strip, and an imperforate plate closing one side of the frame and extending below the inclined bottom face of the frame and cross strip, and coacting with said strip in directing the insects through the opening in the inclined bottom face of the frame.

2. The combination with a screen door, of a rod mounted on the top rail of the door, a frame disposed below said rail and having a side connected with the rod to normally support the said frame in an inclined position with relation to the door, said frame having an inclined bottom face provided with spaced openings, an imperforate plate closing one side of the frame and extending below the inclined bottom face, and a cross strip on said door having a beveled face for closing said openings when the frame is moved to a position to lie in a plane parallel with the door.

In testimony whereof I affix my signature in presence of two witnesses.

IRA E. SAGER.

Witnesses:
 JOHN A. BEACH,
 RUFUS W. STODDARD.